US006641189B2

(12) United States Patent
Moilanen et al.

(10) Patent No.: US 6,641,189 B2
(45) Date of Patent: Nov. 4, 2003

(54) ARTICLE SENSOR ASSEMBLY

(75) Inventors: Steven M. Moilanen, Fort Wayne, IN (US); William D. Givens, Berne, IN (US); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 09/976,778

(22) Filed: Oct. 12, 2001

(65) Prior Publication Data

US 2003/0151266 A1 Aug. 14, 2003

Related U.S. Application Data

(60) Provisional application No. 60/276,547, filed on Mar. 16, 2001.

(51) Int. Cl.⁷ .............................................. B25J 19/02
(52) U.S. Cl. ........................ 294/88; 294/116; 294/907; 901/46
(58) Field of Search ........................... 294/88, 106, 115, 294/116, 907; 901/37, 46, 47; 269/32, 34

(56) References Cited

U.S. PATENT DOCUMENTS

| 4,579,380 | A | * | 4/1986 | Zaremsky et al. ....... 294/119.1 |
| 5,090,757 | A | * | 2/1992 | Huber et al. .................. 294/88 |
| 5,261,715 | A |   | 11/1993 | Blatt et al. |
| 5,383,697 | A |   | 1/1995 | Roudaut |
| 5,503,378 | A | * | 4/1996 | Schauss et al. ............... 269/32 |
| 5,516,173 | A |   | 5/1996 | Sawdon |
| 5,871,250 | A | * | 2/1999 | Sawdon ....................... 294/88 |
| 6,428,070 | B1 | * | 8/2002 | Takanashi et al. ............ 294/88 |

FOREIGN PATENT DOCUMENTS

| EP | 0 857 547 A1 | 8/1998 |
| EP | 0 933 168 A | 8/1999 |

OTHER PUBLICATIONS

DE–STA–CO Gripper Photo No. DSC00132.JPG, No Date.
DE–STA–CO Gripper Photo No. DSC00131.JPG, No Date.
DE–STA–CO Gripper Photo No. DSC00130.JPG, No Date.
DE–STA–CO Gripper Photo No. DSC00134.JPG, No Date.
DE–STA–CO Gripper Photo No. DSC00133.JPG, No Date.
Brochure—ISI Norgren, pp. 4, 5, and 9, IMI Norgren Limited, GC0998, 1998.

* cited by examiner

Primary Examiner—Dean J. Kramer
(74) Attorney, Agent, or Firm—Barnes & Thornburg

(57) ABSTRACT

A fluid actuated parts gripper assembly is provided. The fluid actuated parts gripper assembly has a pair of opposable pivoting jaw members, a fluid driven actuator, first and second linkage structures, a sensor target, a mounting, and a sensor. The sensor target is coupled to the second linkage structure and is movable therewith. The mounting is located adjacent the sensor target, and the sensor is mounted on the mounting such that the sensor is configured to detect the sensor target.

13 Claims, 7 Drawing Sheets

*a*

*b*

ARTICLE SENSOR ASSEMBLY

RELATED APPLICATIONS

The present application is related to and claims priority to U.S. Provisional Patent Application, Ser. No. 60/276,547, filed on Mar. 16, 2001, entitled ARTICLE SENSOR ASSEMBLY FOR GRIPPER. The subject matter disclosed in that provisional application is hereby expressly incorporated into the present application.

TECHNICAL FIELD

The present disclosure relates to fluid actuated grippers of the type employed in automated workpiece handling devices which clampingly grip and transfer a workpiece from one station to another. More particularly, the present invention relates to adjustable article sensor assemblies for such fluid actuated grippers which can detect specific orientations of the jaw member portion of the fluid actuated grippers.

BACKGROUND AND SUMMARY

Fluid pressure actuated grippers are widely employed and typically take the form of a pneumatic or hydraulic differential motor whose cylinder is fixedly mounted to a transfer device. At the forward or rod end of the cylinder housing, a gripper jaw mounting structure is fixedly mounted on the cylinder to pivotally support a pair of opposed gripper jaws which are coupled to the piston rod of the motor by a linkage. This arrangement allows movement of the piston in one direction so that the jaws are pivoted to an open position, and upon movement of the piston in the opposite direction the jaws are driven to a closed workpiece gripping position.

In typical operation, the gripper jaws close upon a workpiece near the edge of same, and the gripper advances to position the gripped workpiece in operative relationship with a work station or portion of a production line. The gripper then opens to release the workpiece and retracts from the work station or production line while the work operation or task is performed. At the conclusion of the operation or task, the gripper advances back into the work station and the jaws again close upon the workpiece and carry it away from the work station.

Such fluid pressure actuated grippers are generally designed for use with particular workpieces to be transferred and with specific work stations or production lines. For example, some workpieces and/or work stations may require wider or narrower gripper jaws, different types of gripper jaws, gripper jaws that open at different angles, jaws that require different clearance requirements, etc., to complete a particular task. Furthermore, such grippers carry workpieces which may be of a variety of sizes or thicknesses.

A known problem associated with production lines employing numerous grippers, which are each completing a specific task as part of a sophisticated series of operations, is that if one gripper fails to complete its task, it could create multiple failures along the production line. This failure has the potential of stopping the entire production line, thus, delaying completion of the operation, as well as the possibility of delaying other operations that rely on the completion of this operation. A common type of failure is the gripper failing to grip the workpiece, the workpiece falling out of the gripper while it is being carried, or the workpiece carrying more than one workpiece at a time (double sheeting). Consequently, these failures translate into increased costs and potential losses in both time and revenue.

Accordingly, it has been contemplated, in an attempt to mitigate such failures, to include sensors on each gripper so that it can detect the presence of the workpiece, lack thereof, or even control the amount the jaw members of the gripper can open or close for particular gripping applications. Such sensors provide interactivity between the gripper and the workpiece itself, allowing the production line to be more intelligent. In fact, as particular tasks are being conducted or completed on the production line, it can be configured to require proper sensor readings at each step of the line, and more specifically, require proper sensor readings before each subsequent step in the line is initiated. This assists in eliminating the entire production line failing and/or being damaged when an initial failure is not immediately detected. In addition, such sensors help monitor the reliability of the line, as well as localize any problems with same.

Sensors for grippers for the purposes described above are known. Examples of such sensors are those used in jaw tips or on the jaw members to detect the existence of a workpiece when being manipulated by the gripper. Another common example is the sensor assembly used for pneumatically powered enclosed clamps. Such a clamp uses a piston rod that includes a targeting device attached thereon. A sensor module is attached to the periphery of the clamp such that a sensor in that module can detect the targeting device at a certain point along the stroke of the jaw arms. The sensor mounts to the sensor module via a locating hole through which the sensor is disposed in order for it to contact the targeting device. The sensor module includes a plurality of locating holes incrementally spaced, and each one configured to accept the sensor. The sensor may be adjusted by separating it from one locating hole in the housing, and moving the sensor to a new position using an alternate locating hole. Typically, these locating holes in the housing have been marked to identify sensor mounting locations that correspond to specific orientations of the clamp (i.e., jaw arm rotation). In other words, these locations establish the sensor mounting location in which the sensor will signal when the clamp is in a specific jaw arm rotation.

Accordingly, an illustrative embodiment of the present disclosure provides a fluid actuated parts gripper assembly. The fluid actuated parts gripper assembly comprises a pair of opposable pivoting jaw members, a fluid driven actuator, first and second linkage structures, a sensor target, a mounting and a sensor. The first linkage structure is driven by the fluid driven actuator. The second linkage structure is coupled to the linkage structure and at least one of the pair of opposable jaw members. The fluid driven actuator causes the first linkage structure to move, which causes the second linkage structure to move at least one of the pair of opposable jaw members. The sensor target is coupled to the second linkage structure and is movable therewith. The mounting is located adjacent the sensor target, and the sensor is mounted on the mounting allowing the sensor to detect the sensor target.

Further embodiments of the illustrative gripper assembly may include the mounting being adjustable relative to the sensor target, the sensor fixed relative to the mounting, and the mounting configured to receive the target. Additionally, the embodiment may have the sensor target being moveable within the mounting, the mounting further including a slot within which the sensor target is moveable. The mounting may further comprise at least one slot configured to receive a fastener that selectively fixes the mounting to the gripper. The adjustment member may also be coupled to the mounting for incrementally adjusting the location of the mounting relative to at least one of the pair of jaw members.

Another illustrative embodiment of the present disclosure provides a fluid actuated parts gripper assembly having an adjustable sensing mechanism. The fluid actuated parts gripper assembly comprises a body, a pair of opposable jaw members, a cam pin, a linkage structure, a sensor target, a mounting, and a sensor. The body includes a yoke structure that is defined at one end by a pair of spaced apart wall members, and a fluid driven actuator at an opposite end. One of the pair of spaced apart wall members includes an opening disposed therein. At least one of the pair of opposable jaw members is pivotable, and each of the pair of opposable jaw members includes through-slots located therein. The cam pin extends into the through-slots of each of the pair of opposable jaw members and is disposed through the opening in one of the pair of spaced apart wall members. Additionally, the cam pin is movable within the opening. The linkage structure is driven by the fluid driven actuator and is coupled to the cam pin. The sensor target is coupled to the cam pin and is movable therewith. The mounting is configured to receive the sensor target, and the sensor is mounted on the mounting.

Another illustrative embodiment of the present disclosure provides an adjustable spacer for a sensor mounting on a fluid activated parts gripper. The adjustable spacer comprises a member having a plurality of sides. Each of the plurality of sides is located at a different length from a location on the member. The illustrative embodiment may further include the location being a bore disposed through the member. The member itself may have opposed surfaces with each being non-equidistant from the location. The member may also be hexagonal with opposed surfaces each being non-equidistant from the location.

Another illustrative embodiment of the present disclosure provides a fluid actuated parts gripper assembly of the type having a gripper body with an opening disposed therethrough configured to receive a pin that is movable in concert with at least one of a pair of opposable jaw members. In addition, the fluid actuated parts gripper also has an adjustable sensor mounting assembly disposed thereon. The sensor mounting assembly comprises a mounting body, an adjustable spacer member and a fastener. The mounting body is attachable to the gripper body over the opening. In addition, the mounting body includes an aperture disposed therethrough and a stop member extending from a portion of the aperture. The adjustable spacer member includes a plurality of sides with each located at a different length from a location on the member. The fastener is disposed through the aperture of the mounting body to selectively secure the adjustable spacer member and the mounting body to the gripper body such that one of the plurality of sides is adjacent the stop member. The illustrative embodiment may also comprise each one of the plurality of sides of the adjustable spacer member to locate the mounting body to a unique position relative to the gripper body.

Another illustrative embodiment of the present disclosure provides an adjustable spacer for a sensor mounting on a fluid activated parts gripper. The adjustable spacer comprises a member having a periphery disposed thereabout. The periphery is segmented into a plurality of discrete surfaces such that each of the plurality of discrete surfaces is located at a unique distance from one location on the member.

Additional features and advantages of the gripper assembly will become apparent to those skilled in the art upon consideration of the following detailed description of the illustrated embodiment exemplifying the best mode of carrying out the gripper assembly as presently perceived.

BRIEF DESCRIPTION OF DRAWINGS

The present disclosure will be described hereafter with reference to the attached drawings which are given as non-limiting examples only, in which:

FIG. 6a is a perspective view of the fluid actuated gripper with another embodiment of the article sensor assembly shown in exploded view;

FIG. 6b is a perspective view of the sensor housing for use with the article sensor assembly of FIG. 6a; and FIG. 7 is a side view of the fluid actuated gripper and article sensor assembly of FIG. 6a.

Corresponding reference characters indicate corresponding parts throughout the several views. The exemplification set out herein illustrates embodiments of the article sensor assembly, and such exemplification is not to be construed as limiting the scope of the article sensor assembly in any manner.

DETAILED DESCRIPTION OF THE DRAWINGS

Figure 1:
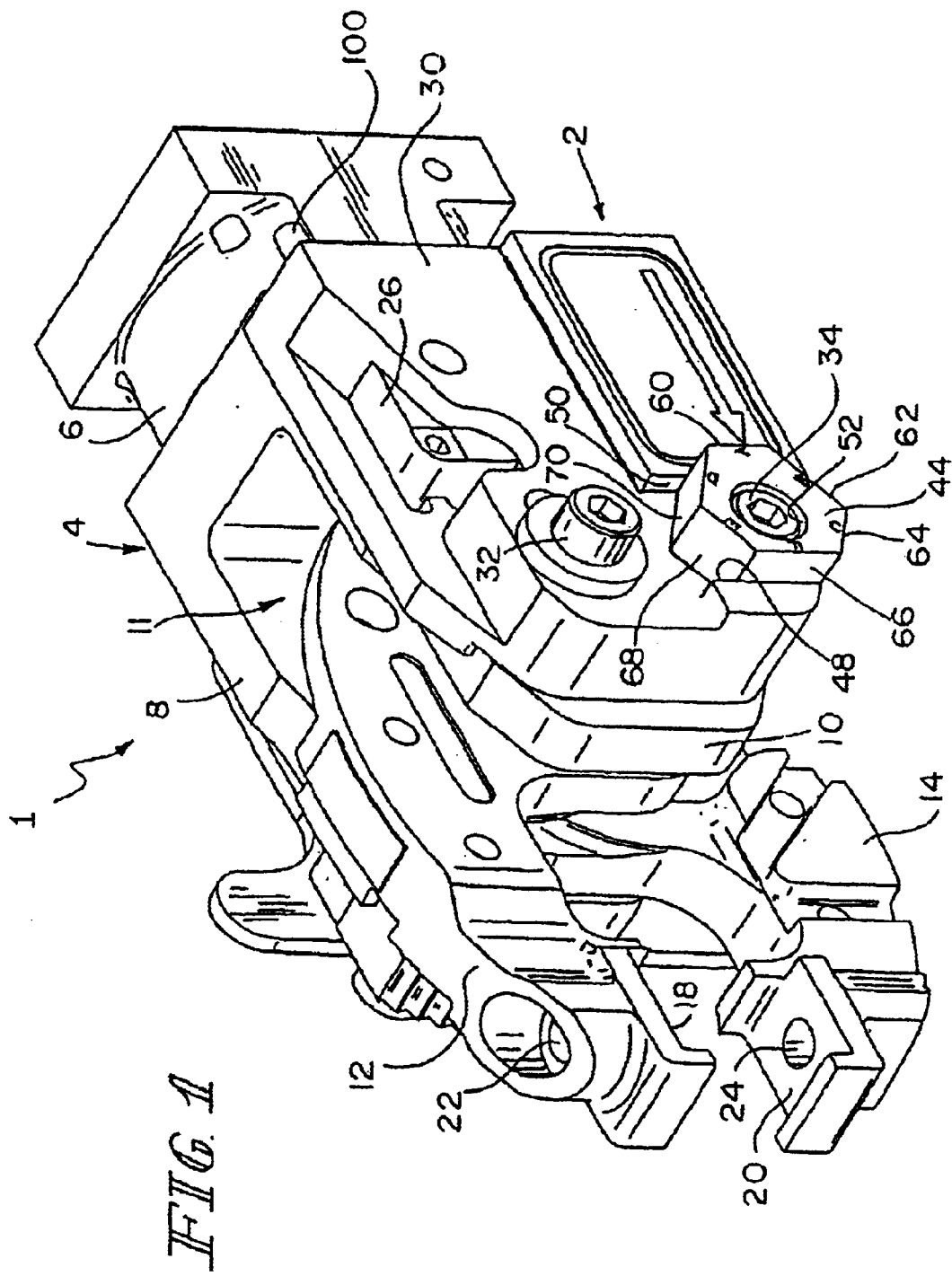
FIG. 1 is a perspective view of a fluid actuated gripper having an article sensor assembly attached thereto.

The present disclosure is directed to a fluid actuated gripper 1 having an article sensor assembly 2 attached thereto, as shown in FIG. 1. The fluid actuated gripper 1, illustratively, comprises a yoke structure 4 which is coupled to a body 6. Illustratively, body 6 is a pneumatic or hydraulic differential motor cylinder. Yoke structure 4 is defined by two, generally parallel, spaced apart side walls 8, 10. According to the illustrated embodiment, each wall 8, 10 extends outwardly from the body 6, with a cutout portion 11 located there between. It is appreciated that the body 6 can be oriented in any manner with respect to yoke structure 4. Examples of the types of grippers for use with the article sensor assembly 2, as described further herein, are U.S. Pat. No. 6,273,408, entitled MOUNTING BRACKET FOR MODULAR WORKPIECE HOLDER, U.S. Pat. No. 6,048,013, entitled MODULAR STAMPED PARTS TRANSFER GRIPPER, U.S. Pat. No. 6,056,281, entitled ADJUSTABLE STOPPERS AND MOUNTING ASSEMBLIES FOR PARTS GRIPPERS, and U.S. Pat. No. 5,941,513, entitled MOUNTING BRACKET FOR MODULAR WORKPIECE HOLDER, all of the disclosures of which are hereby expressly incorporated by reference.

A pair of opposable jaw members 12, 14 are located in cut-out portion 11. Illustratively, each jaw member 12, 14 is pivotable about a common axis (pivot pin 90, see FIG. 2), pursuant to pneumatic action commonly known in the art. It is appreciated that movement of jaw members 12, 14 can be actuated by any means, including electrical or other fluid, both means known commonly in the art. As depicted, jaw member tips 18 and 20, located at the ends of jaw members 12, 14, respectively, oppose each other, are movable between open and closed positions as jaw members 12, 14 move, and are configured to receive gripper tips (not shown) of any variety for carrying a workpiece. Each jaw member tip 18, 20, illustratively, includes a threaded bore 22, 24, respectively, each configured to receive a corresponding threaded screw of a gripper tip.

Article sensor assembly 2 is illustratively attached to wall 10 of yoke structure 4. As jaw members 12, 14 move, a sensor 26 detects such movement. In an illustrative embodiment, sensor 26 detects the relative position of jaw members 12, 14 with respect to yoke structure 4. Specifically, and as discussed further herein, the sensor 26 detects a target 82 when moved to a predetermined location, thus indicating that the cam pin 28 is at that location. (See FIG. 3.) Because jaw members 12, 14 are movable in response to movement of cam pin 28, sensor 26, in essence, detects the degree of opening between jaw member tips 18 and 20. When jaw member tips 18 and 20 are separated by a predetermined amount, sensor 26 will detect same and either send a signal to a controller (not shown), or illuminate a light, like a LED, indicating detection. It is contemplated that the configuration of such an article sensor assembly 2 can detect whether one or more workpieces are being held between jaw members 12, 14. The sensor 26 can also be connected to a stop mechanism (not shown) to control the degree of separation between the jaw members. Alternatively, it is contemplated that sensor 26 can be used to sound an alarm if jaw members 12, 14 reach a particular separation.

Because the length of separation between jaw members 12, 14 might be a variable amount, it is contemplated that one embodiment of article sensor assembly 2 can be adjustable. In the illustrated embodiment, an operator can move sensor housing 30 relative to wall 10. Moving sensor housing 30 moves the point at which sensor 26 will detect target 82. (See also FIGS. 4a through c.) Sensor housing 30 is movable consonant with the loosening of two fasteners 32, 34, which are disposed through slots 36, 38, respectively, and fastened to bores 40, 42, respectively, in wall 10. (See FIG. 2.) According to the illustrated embodiment, sensor housing 30 can move to any location along a direction generally parallel with linear orientation of wall 10 within the length of slots 36, 38. It is contemplated that other aperture, or aperture-like structures, can be used to define the movement of sensor housing 30 in the stead of slots 36, 38.

To assist in controlling the amount of movement available by sensor housing 30, a stop washer 44 is coupled with fastener 34 and housing 30 to limit movement of same. One illustrated embodiment shown in FIG. 1 shows stop washer 44 positioned between stop edges 48, 50 which are part of sensor housing 30. Edges 48, 50 limit lateral movement of stop washer 44, thus ensuring a proper and consistent fit of stop washer 44 within sensor housing 30. In the illustrated embodiment, stop washer 44 is a hexagonal structure having six surfaces 60, 62, 64, 66, 68, 70. A central bore 52 is disposed through stop washer 44 which receives fastener 34. Central bore 52 is not necessarily positioned in the center of stop washer 44. Rather, central bore 52 is offset such that opposite surfaces of stop washer 44 are different distances from central bore 52. For example, side 60 is one distance (in this illustrative embodiment, a distance of 0.52 inches), and the opposite edge 66 is a second distance (illustratively, a distance of 0.28 inches).

The effect of this offset positioning of central bore 52 is that stop washer 44 can be rotated, and each edge that is placed adjacent edge 50, for example, moves sensor housing 30 a specific and repeatable distance relative to wall 10. Specifically, though each surface 60, 62, 64, 66, 68, 70 is a different distance from the central bore, each opposed surface equals the same diameter as every other diameter. For example, the distance between surfaces 60 and 66 is, illustratively, 0.80 inches and, similarly, distances between 62 and 68, 64, and 64 and 70 are each 0.80 inches as well. Having the same diameter allows the stop washer 44 to be rotated, and each will fit adjacent edges 48, 50. Because fastener 34 remains fixed in bore 42, and sensor housing 30 is movable along fastener 34 the extent of slot 38, this offset positioning of central bore 52, in combination with the different distances of edges causes sensor housing 30 to move in direction 72 or 74 depending on which orientation the stop washer 44 is positioned between edges 48, 50 of housing 30. (See FIG. 2.)

Furthermore, because this arrangement includes each side being a unique distance from central bore 52, yet, each pair of opposed surfaces being identical diameters apart, creates relatively small increments allowing an operator to move different surfaces adjacent edges 48, 50, creating a stepped approach to moving sensor housing 30. For example, by moving surface 62 from surface 60, adjacent edge 50, sensor housing 30 will move 0.04 inches in the direction of 72. Moving stop surface 64 from surface 62, adjacent edge 50, sensor housing 30 will move an additional 0.04 inches in the direction of 72. The reverse is true as well. Moving surface 66 from surface 64, adjacent edge 50, sensor housing 30 will move 0.04 inches in the direction of 74. Moving surface 68 from surface 66, adjacent edge 50, sensor housing 30 will move another 0.04 inches in the direction of 74. Moving surface 60 from surface 66, adjacent edge 50, sensor housing 30 will move a total of 0.20 inches in the direction of 74 from surface 64.

Figure 2:
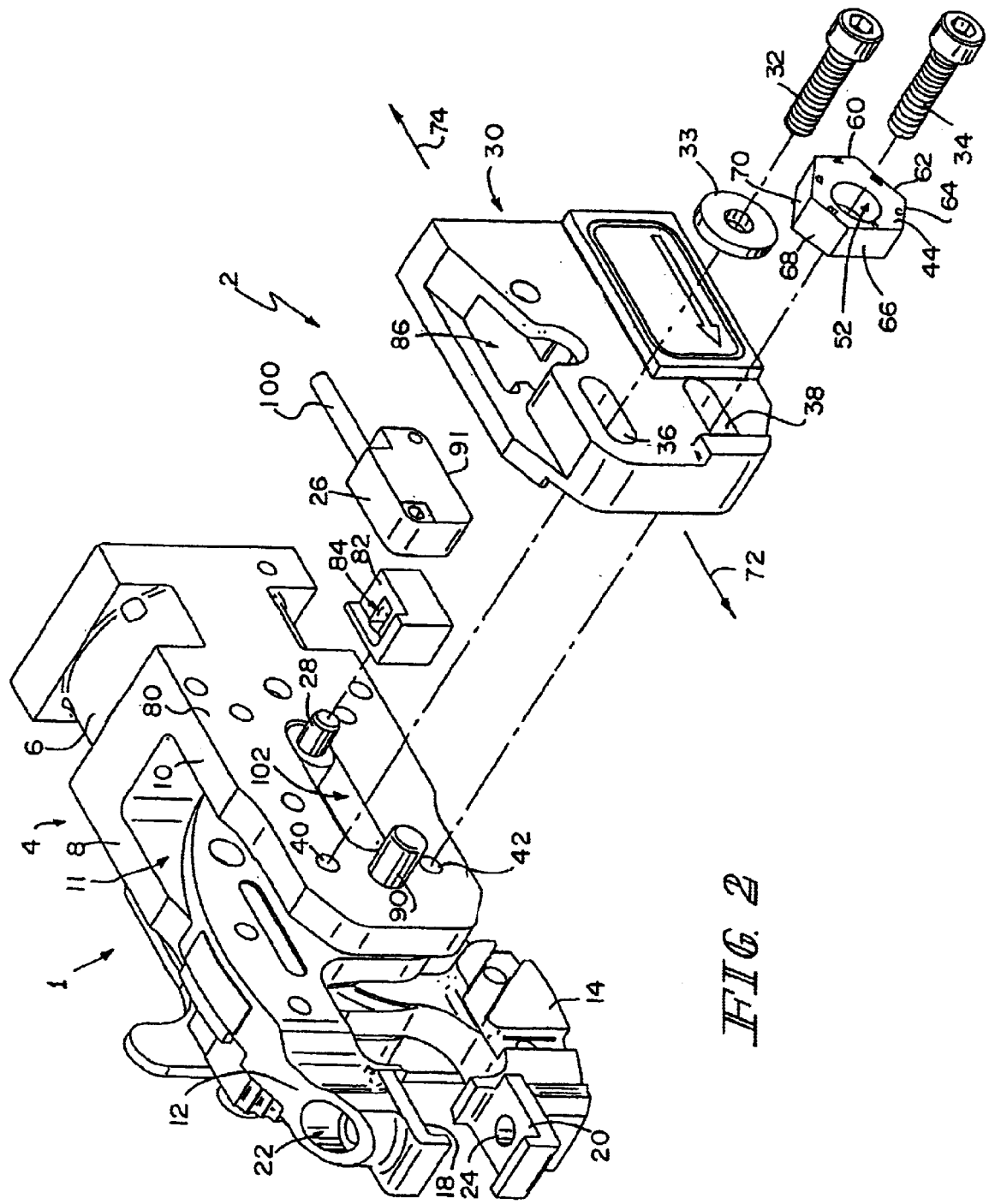
FIG. 2 is a perspective view of the fluid actuated gripper of FIG. 1 with the article sensor assembly shown in exploded view.

Another perspective view of the fluid actuated gripper 1 is shown in FIG. 2. Also shown is the article sensor assembly 2 in exploded view. Specifically, shown is how sensor housing 30 attaches adjacent surface 80 of wall 10. Target 82, illustratively, includes a bore 84 through which cam pin 28 extends, thereby coupling the two structures together. (See FIG. 3.) Sensor 26 is placed into sensor recess 86 which includes an access slot 88 thereby allowing access of sensing portion 91 of 26 to target 82 when the target is located within slot 89 of housing 30. (See FIGS. 3 and 5a.) Sensor housing 30 is secured adjacent surface 80 via fasteners 32, 34 which are disposed through slots 36, 38, respectively, and fastened to bores 40, 42, respectively, in wall 10, as previously discussed. As is common with the fasteners of the type shown in FIG. 2, as they tighten, sensor housing 30 is increasingly secured against wall 10.

Figure 3:
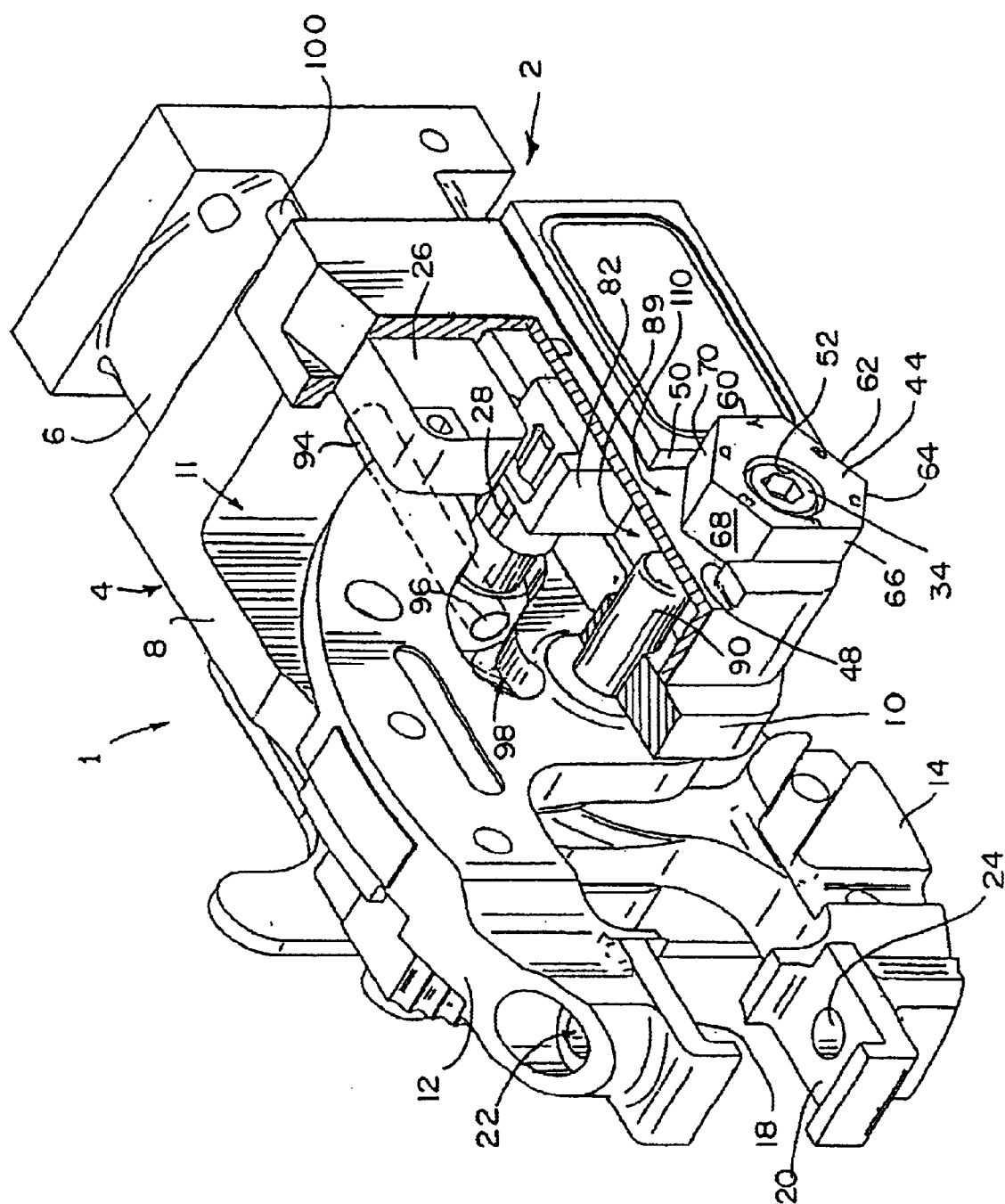
FIG. 3 is a partially cut-away perspective view of the fluid actuated gripper of FIG. 1 with the article sensor assembly attached thereto.

A partially cut-away perspective view of the fluid actuated gripper 1 and the article sensor assembly 2 attached thereto is shown in FIG. 3. This view shows the spatial relationship and interaction between the major components of the fluid actuated gripper 1 and the article sensor assembly 2. A piston rod 94 links jaw members 12, 14 to the pneumatic or hydraulic differential motor cylinder, or other motor driver. Specifically, piston rod 94 is coupled to a bushing 96 which itself is coupled to cam pin 28. As piston rod 94 moves reciprocally in directions 72 and 74, cam pin 28 is caused to move in concert therewith. The movement of cam pin 28 causes same to engage cam slots 98 which exist on both jaw members 12, 14. In the illustrated embodiment, as piston rod 94 moves cam pin 28 in direction 72, cam pin 28 follows the path of cam slots 98, thereby causing the jaw members 12, 14 to open by pivoting about a pivot pin 90. Conversely, as piston rod 94 moves cam pin 28 in direction 74, cam pin 28 follows the reverse path of cam slots 98, thereby causing the jaw members 12, 14 to close by pivoting about pivot pin 9.0. It is appreciated that both jaw members 12, 14 do not necessarily have to pivot about pivot pin 90. Gripper 1 may be so configured that only one jaw member, either 12 or 14, may pivot. Additionally, pivot pin 90 is shown extending into slot 89.

As cam pin 28 moves in either direction 72 or 74, so too does target 82. Target 82 is configured to move within slot 89 of sensor housing 30. Sensor 26, positioned above slot 89 and target 82, illustratively, remains stationary relative to slot 89. Accordingly, as cam pin 28 moves both target 82 and jaw members 12, 14, target 82 will pass underneath sensor 26 at some location along slot 89. At this point, sensor 26 will detect the presence of target 82, and signal the controller through line 100 to initiate a desired response. Alternatively, line 100 may be a power cord, and sensor 26 and target 82 form a switch that powers a LED (not shown) when in contact.

The adjustability of sensor housing 30 allows that point at which the sensor 26 detects the target 82 to be anywhere along the slot 102 through which cam pin 28 extends, and which defines the extent to which cam pin 28 can travel. By rotating stop washer 44 to various positions, sensor housing 30 moves along surface 80 to specific repeatable distances, changing the point at which the sensor 26 detects target 82.

Figure 4:
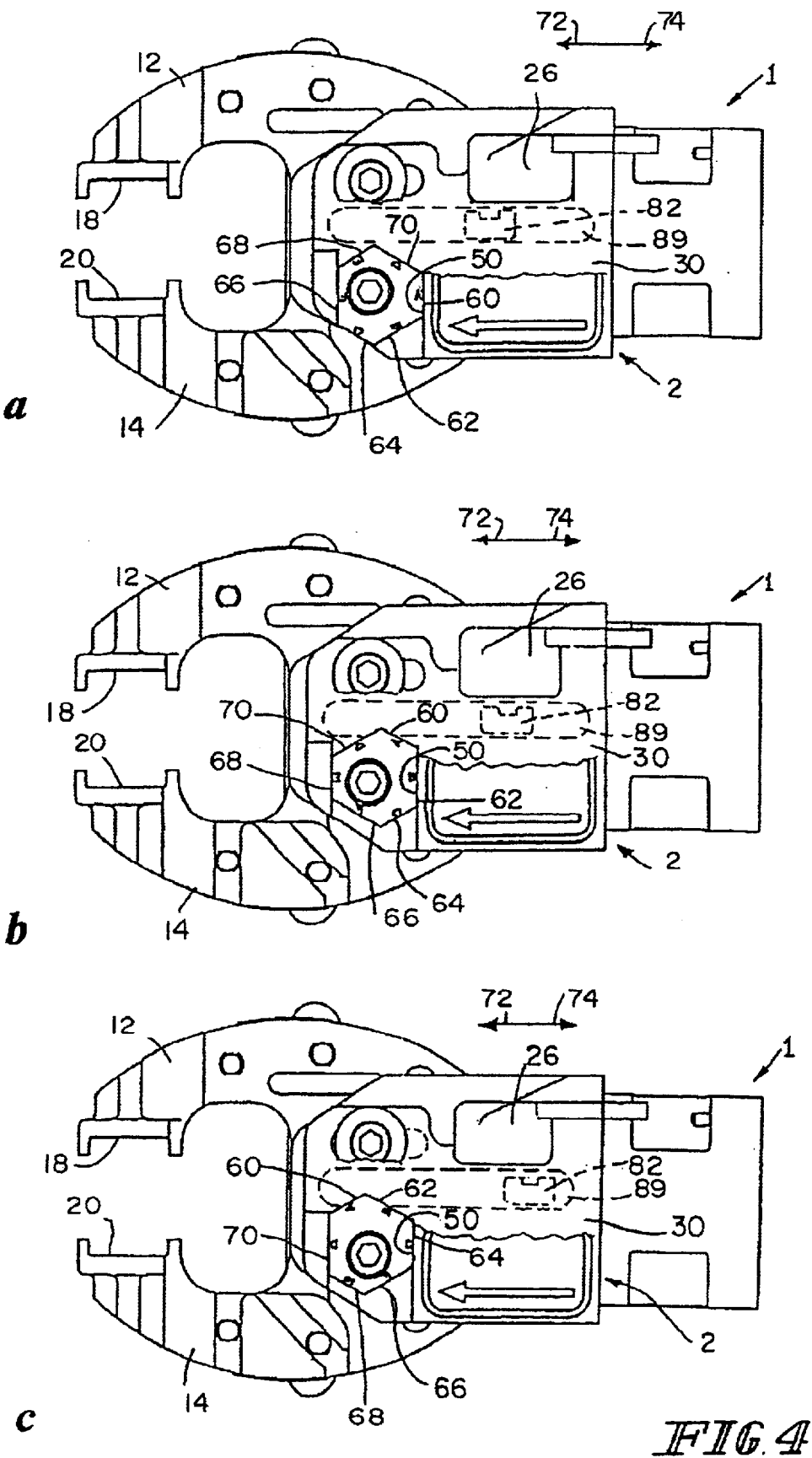
FIGS. 4a through c are side views of the fluid actuated gripper of FIG. 1 showing successive adjustment positions of the article sensor assembly relative to the gripper body.

FIGS. 4a through c illustrate the adjustability of sensor housing 30 relative to the position of stop washer 44 for detecting target 82 at different positions along slot 89. As shown in FIG. 4a, stop washer 44 is positioned such that surface 60 is located adjacent edge 50 of sensor housing 30. In this illustrative embodiment, target 82 is positioned underneath sensor 26. As shown in FIG. 4b, stop washer 44 is positioned such that surface 62 is located adjacent edge 50 of sensor housing 30. In this case, target 82 is still positioned underneath sensor 26, but with sensor housing 30 moved in direction 72 to a new position, target 82 will move further in direction 72 for the sensor 26 to still detect the target 82. As shown in FIG. 4c, stop washer 44 is positioned such that surface 64 is located adjacent edge 50 of sensor housing 30. In this case, target 82 is, again, positioned underneath sensor 26, but sensor housing 30 is also, again, moved in direction 72 to another new position. Consequently, target 82 will, again, move further in direction 72 for the sensor 26 to still detect the target 82. Thus, sensor 26 will detect target 82 as the separation between jaw tips 18, 20 increases between stop member surfaces 60 through 64.

Conversely, and not shown, moving stop washer 44 to a position such that surface 66 is located adjacent edge 50 causes sensor housing 30 to move in direction 74, causing sensor 26 to also move further in direction 74 in order to contact target 82.

Figure 5:
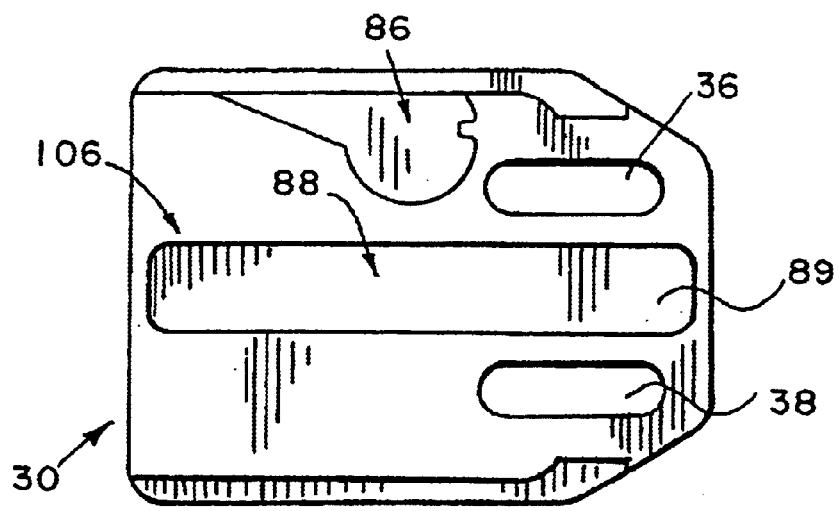
FIGS. 5a and b are side views of the face and rear of the sensor housing portion of the sensor assembly of FIG. 1.
Figure 5:
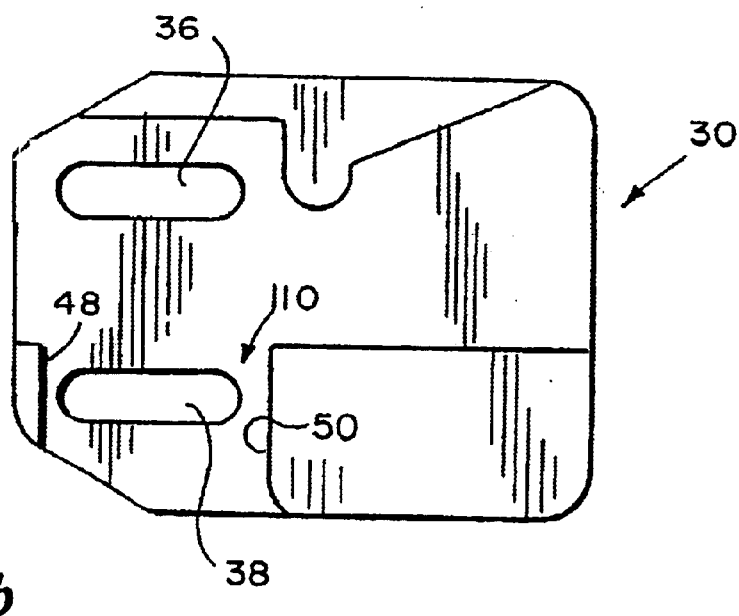

One embodiment of sensor housing 30 is shown in FIGS. 5a and b. The rear view of housing 30 shows slot 89 and access slot 88 there above allowing sensor 26 to rest on ledge 106 and access target 82 when positioned within slot 89. It is appreciated that in such an embodiment, sensor 26 detects target 82 at the same position relative to slot 89. The position at which target 82 is detected relative to distance between tips 18, 20 is dependent on the position of sensor housing 30 relative to wall 10. For example, illustratively, sensor 26 may detect target 82 every time target 82 passes the longitudinal center of slot 89, regardless of what the desired position of tips 18, 20 should be when the operator wishes the sensor to react. To set assembly 2 so that sensor 26 will detect target 82 when the tips 18, 20 are at the desired separation, housing 30 will be positioned at a location adjacent surface 80 such that the target 82 is aligned with sensor 26 when the tips have the desired separation.

Housing 30 also includes a recess portion 110 that contains slot 38 and is bordered by edges 48, 50. Recess 110 is sized to receive stop washer 44. It is contemplated that other embodiments of housing 30 may not comprise such a recess 110 or edges 48, 50, but rather, include merely the slot 38 allowing free adjustability of the housing relative surface 80 of wall 10. (See FIG. 6a.)

Figure 6:
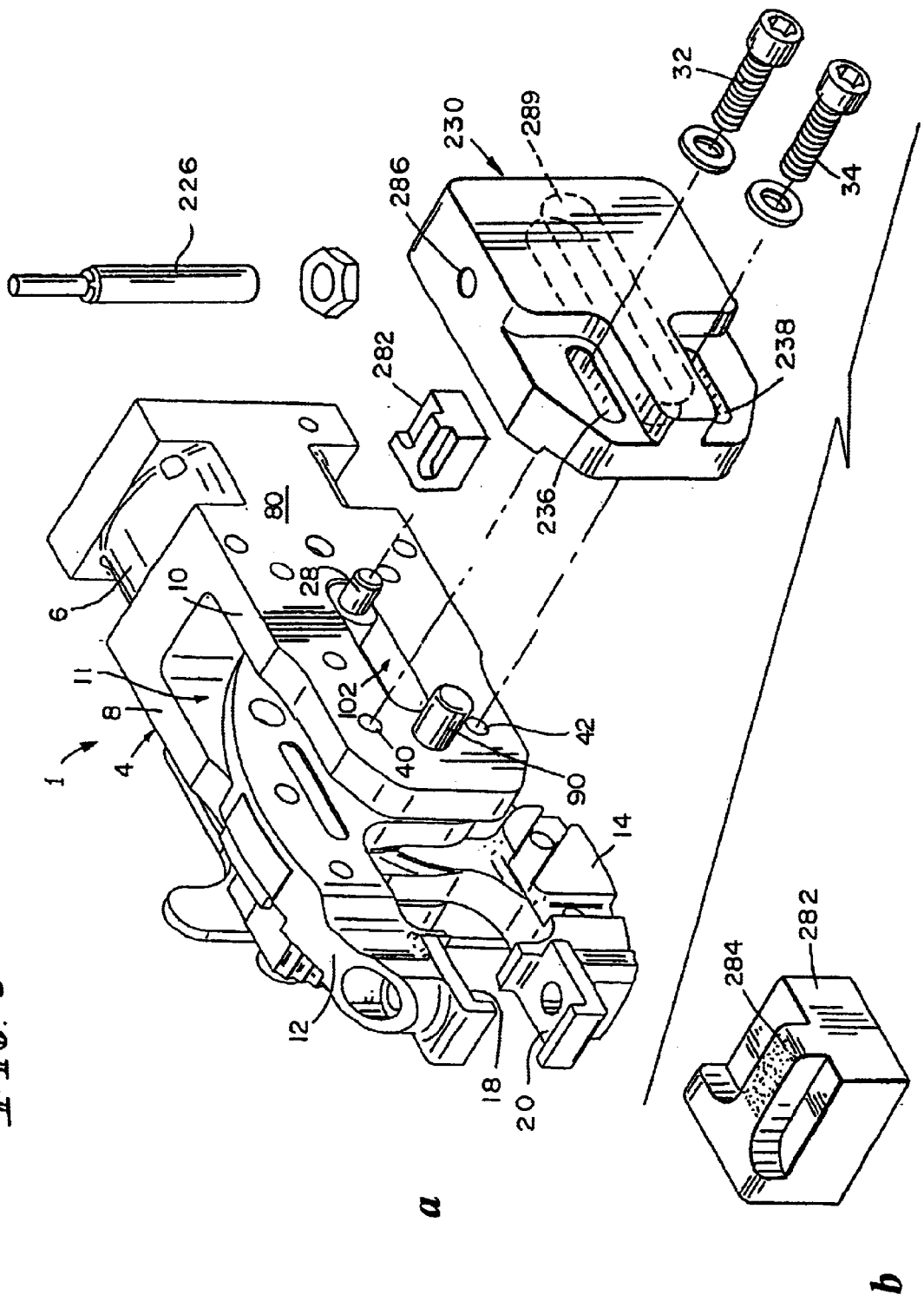

The fluid actuated gripper 1 is shown in FIG. 6a with another embodiment of the article sensor assembly 202 shown in exploded view. Article sensor assembly 202 is attachable to wall 10 of yoke structure 4. As jaw members 12, 14 move, a sensor 226 detects such movement. In an illustrative embodiment, sensor 226 detects the relative position of the jaw members with respect to yoke structure 4. Specifically, the sensor 226 detects a cam pin 28 when moved to a predetermined location, thus indicating that the cam pin 28 is at that location, as previously discussed. When jaw member tips 18 and 20 are separated by a predetermined distance, sensor 226 will detect same, and send a signal to a controller or illuminate a LED, also as previously discussed.

Similar to article sensor assembly 2, it is contemplated that sensor assembly 202 can also be adjustable. The distinction between the illustrated embodiment of sensor assembly 202 and assembly 2 is that assembly 202 does not utilize stop washer 44. In the illustrated embodiment of sensor assembly 202, sensor housing 230 is movable consonant with the loosening of two fasteners 32, 34 which are disposed through slots 236, 238, respectively, and fastened to bores 40, 42, respectively, within wall 10. According to the illustrated embodiment, sensor housing 230 can move to any location along a direction parallel with linear orientation of wall 10 within the length of slots 236, 238. It is contemplated that a stop-washer like that of stop washer 44 is not required to this embodiment.

Figure 7:
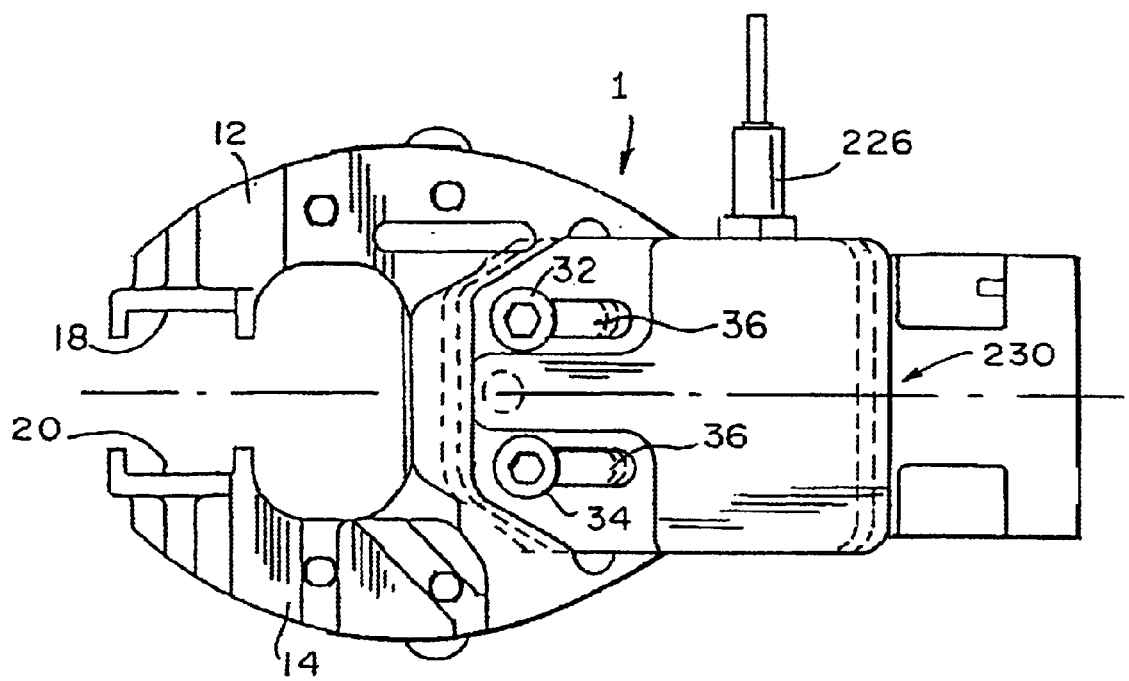

Fluid actuated gripper 1 is also shown in FIG. 7 with the sensor assembly 202 attached thereto, along with an illustrative range of movement of same (in hatched lines). It is appreciated from this view the range of movement available which is not dependent on fixed increments established by a stop washer. A target 282 is shown in both FIGS. 6a and 6b. Target 282, illustratively, includes a target surface 284, detectable by sensor 226. Sensor 226 is placed into sensor bore 286 which provides access to target surface 284 when target 282 is positioned in slot 289 (in hatched lines) of housing 230.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A fluid actuated parts gripper assembly comprising:
   a pair of opposable pivoting jaw members;
   a fluid driven actuator;
   a first linkage structure driven by the fluid driven actuator;
   a second linkage structure coupled to the first linkage structure and at least one of the pair of opposable jaw members;
   wherein the fluid driven actuator causes the first linkage structure to move which causes the second linkage structure to move at least one of the pair of opposable jaw members;

a sensor target coupled to the second linkage structure and being movable therewith;

a mounting located adjacent the sensor target; and a sensor mounted on the mounting configured to detect the sensor target;

wherein the mounting is adjustable relative to the sensor target.

2. The gripper assembly of claim 1, wherein the sensor is fixed relative to the mounting.

3. The gripper assembly of claim 1, wherein the mounting is configured to receive the sensor target, and wherein the sensor target is moveable within the mounting.

4. The gripper assembly of claim 3, wherein the mounting includes a slot within which the sensor target is moveable.

5. The gripper assembly of claim 1, wherein the mounting comprising at least one slot configured to receive a fastener that selectively fixes the mounting to the gripper.

6. The gripper assembly of claim 5, wherein the slot is a pair of slots.

7. The gripper assembly of claim 1, wherein an adjustment member is coupled to the mounting for incrementally adjusting the location of the mounting relative to at least one of the pair of jaw members.

8. A fluid actuated parts gripper assembly having an adjustable sensing mechanism comprising:

a body having a yoke structure defined at one end thereof by a pair of spaced apart wall members, and a fluid driven actuator at an opposite end;

wherein one of the pair of spaced apart wall members having an opening disposed therein;

a pair of opposable jaw members, at least one of the pair of opposable jaw members being pivotable and each of the pair of opposable jaw members having through-slots located therein;

a cam pin extending into the through-slots of each of the pair of opposable jaw members and disposed through the opening in one of the pair of spaced apart wall members;

wherein the cam pin is movable within the opening;

a linkage structure driven by the fluid driven actuator and coupled to the cam pin;

a sensor target coupled to the cam pin and being movable therewith;

a mounting configured to receive the sensor target; and a sensor mounted on the mounting configured to detect the sensor target;

wherein the mounting is adjustable relative to the sensor target.

9. The parts gripper assembly of claim 8, wherein the mounting is incrementally adjustable relative to one of the pair of spaced apart wall members.

10. The gripper assembly of claim 9, wherein an adjustment member is coupled to the mounting for incrementally adjusting the location of the mounting relative to one of the pair of jaw members.

11. The parts gripper assembly of claim 8, wherein the opening is a slot defining the extent the cam pin can move.

12. The parts gripper assembly of claim 11, wherein the mounting includes a slot within which the sensor target is moveable.

13. The parts gripper assembly of claim 12, wherein the slot of the mounting is located adjacent one of the pair of spaced apart wall members.

* * * * *